Patented Mar. 16, 1937

2,073,954

UNITED STATES PATENT OFFICE 2,073,954

ERGOT ALKALOID AND PROCESS FOR OBTAINING THE SAME

Emil Wolf, Budapest, Hungary, assignor, by mesne assignments, to Parke, Davis & Company, Detroit, Mich., a corporation of Michigan No Drawing. Application December 3, 1931, Serial No. 578,852. In Hungary September 17, 1931

6 Claims. (Cl. 260—25)

Up to the present time four water soluble alkaloids have been prepared from ergot, viz.—1, the ergotamin of Stoll, 2, ergotaminine, 3, ergotoxine, and 4, ergotinine; 2 and 4 are transformation products of 1 and 3.

The methods of separation and the properties of these alkaloids are published in the following papers:

Stoll Schweizer Apoth. Zeitung, 60, 1922, 341; Schmidt, Pharm. Chemie II.2.1978, 1923; F. Krafft, Archiv d. Pharmacie, 1906, 244, 336; G. Barger, Chem. News, 1906, 94, 89; Barger & Carr, Journ. of the Chem. Soc. 1907, 91, 337; Tanret, Compt. rend. 1875, 81, 896; Smith & Timmis, Journ. of the Chem. Soc. 1930, 1390–95; Frèrejacque & Raymond-Hamet, Rev. de. pharm. et de thérap, experim. 1929, 4,333; DRP. 357.272 and Brit. Pat. 286,400.

Every one of the methods specified in these papers suggest the use in at least one stage of methyl alcohol, or acetone, or ether.

My invention relates to the production of a new alkaloid from ergot. This new alkaloid can be clearly distinguished from the above mentioned known alkaloids. It is indifferent to alkali hydroxides, is soluble in their aqueous solutions and can be recovered from such solutions. It is soluble in benzene, chloroform, dioxan, dichlorethylene and crystallizes from such solutions unchanged; in particular the crystals obtained from a dichlorethylene solution are finely developed. They melt and decompose at 180–184° C. The specific rotation in chloroform is $$[\alpha]_D^{30} = +125°.$$

In this respect, the physiologically very active new ergot alkaloid differs from ergotoxine and ergotamine, which, although having a similar great physiological potency, exhibits in chloroform a negative specific rotation. Another difference consists in the greater solubility in water of the sulphate of the new ergot alkaloid, namely 1:400. From ergotinine and ergotaminine the new alkaloid differs in its much greater physiological effect.

The average percentual composition of the new alkaloid is: C 66.6%, H 6.61%, N 12.42%, O 14.37%, so that $C_{31}H_{37}N_5O_5$ may be assumed as empirical formula for the new compound.

A very characteristic property of the new ergot alkaloid consists in its great sensitivity to several organic solvents which transform it very soon after being dissolved in a substance insoluble in the solvent used. Such reactive organic solvents are, for instance, methyl and ethyl alcohol, acetone, ethyl ether. On the other hand, ergotoxine and ergotamine are to such a high degree non-reactive to these solvents that the cited papers suggest the use of such solvents for the extraction and in the case of the ergotamine of Stoll even for the crystallization of the alkaloids.

Taking into consideration the reactivity of the new ergot alkaloid to the reactive solvents mentioned, one process for the production of the new alkaloid from ergot consists in the application of the well known general methods for preparing alkaloids, excluding, however, from these methods the use of solvents to which the new ergot alkaloid is sensitive.

Accordingly ergot, preferably after extraction with petrol ether, is mixed with alkali, for example magnesium hydroxide, of lower alkalinity than sodium hydroxide and the mixture extracted with an inert solvent that is a non-reactive solvent such as benzene, chloroform, dichlor ethylene. From this solution the crude bases are extracted with acidulated water, from which the alkaloids are freed by alkali and extracted by a non-reactive solvent which after partial evaporation yields crystals of the crude ergot alkaloid, which is repeatedly recrystallized, preferably from dichlor ethylene, until the crystals show the specific rotation and melting point mentioned before. One part of the new ergot alkaloid dissolved in 7 parts warm (55° C.) dichlor ethylene crystallizes in form of prisms pointed at both ends. The physical constants and the crystal structure of the new alkaloid remain unchanged even after repeated recrystallizations.

It is advisable to use dichlor ethylene for the recrystallization of the crude alkaloid.

Another method for producing the new ergot alkaloid consists in transforming the raw alkaloids obtained in the above specified manner into sulphates, keeping in mind however that the sulphate of the new alkaloid is relatively easily soluble. From the sulphates the pure alkaloid is obtained as in the previous example.

What I claim is:

1. A physiologically highly active ergot-alkaloid, soluble in and crystallizable from benzene, chloroform, dioxan and dichlorethylene, having a specific rotation in choloroform of $$[\alpha]_D^{30} = +125°$$

and a melting point of 180–184° C.

2. In a process for the production of a physiologically active ergot-alkaloid, the step of treating ergot with magnesium hydroxide to liberate an alkaloid therefrom.

3. In a process for the production of a positively rotatory physiologically active ergot-alkaloid by extracting degreased and alkalized ergot with a solvent for the alkaloid of the class consisting of benzene, chloroform, dioxane and dichlorethylene and separating alkaloid from solvent, the step comprising recrystallizing the alkaloid from dichlorethylene.

4. The process of producing a physiologically active ergot-alkaloid comprising extracting ergot with petroleum ether, mixing the residue therefrom with magnesium hydroxide, extracting said mixture with an inert solvent of the class consisting of benzene, chloroform, dioxan and dichlorethylene, treating the solution of alkaloid so obtained in said inert solvent with acidulated water to form an aqueous solution of a salt of the alkaloid, treating said aqueous solution with a base to free the alkaloid from its salt, extracting the alkaloid from the aqueous solution with an inert solvent of said class, evaporating inert solvent from the extract until crystals are produced, separating the crystals and recrystallizing from a solvent of said class.

5. The process of producing a positively rotatory physiologically active ergot alkaloid comprising extracting degreased and alkalized ergot with a non-reactive organic solvent, treating the solution of alkaloid so obtained in said non-reactive solvent with acidulated water to form an aqueous solution of a salt of the alkaloid, treating said aqueous solution with a base to free the alkaloid from its salt, extracting the alkaloid from the aqueous solution with a non-reactive organic sovent, crystallizing an alkaloid from said non-reactive organic solvent, separating the crystals and recrystallizing from a non-reactive organic solvent.

6. The process of producing a positively rotatory physiologically active ergot alkaloid comprising extracting degreased and alkalized ergot with a non-reactive organic solvent, separating the crude alkaloid thus obtained from said solvent and recrystallizing the alkaloid from a non-reactive organic solvent.

EMIL WOLF.